Figure 1:
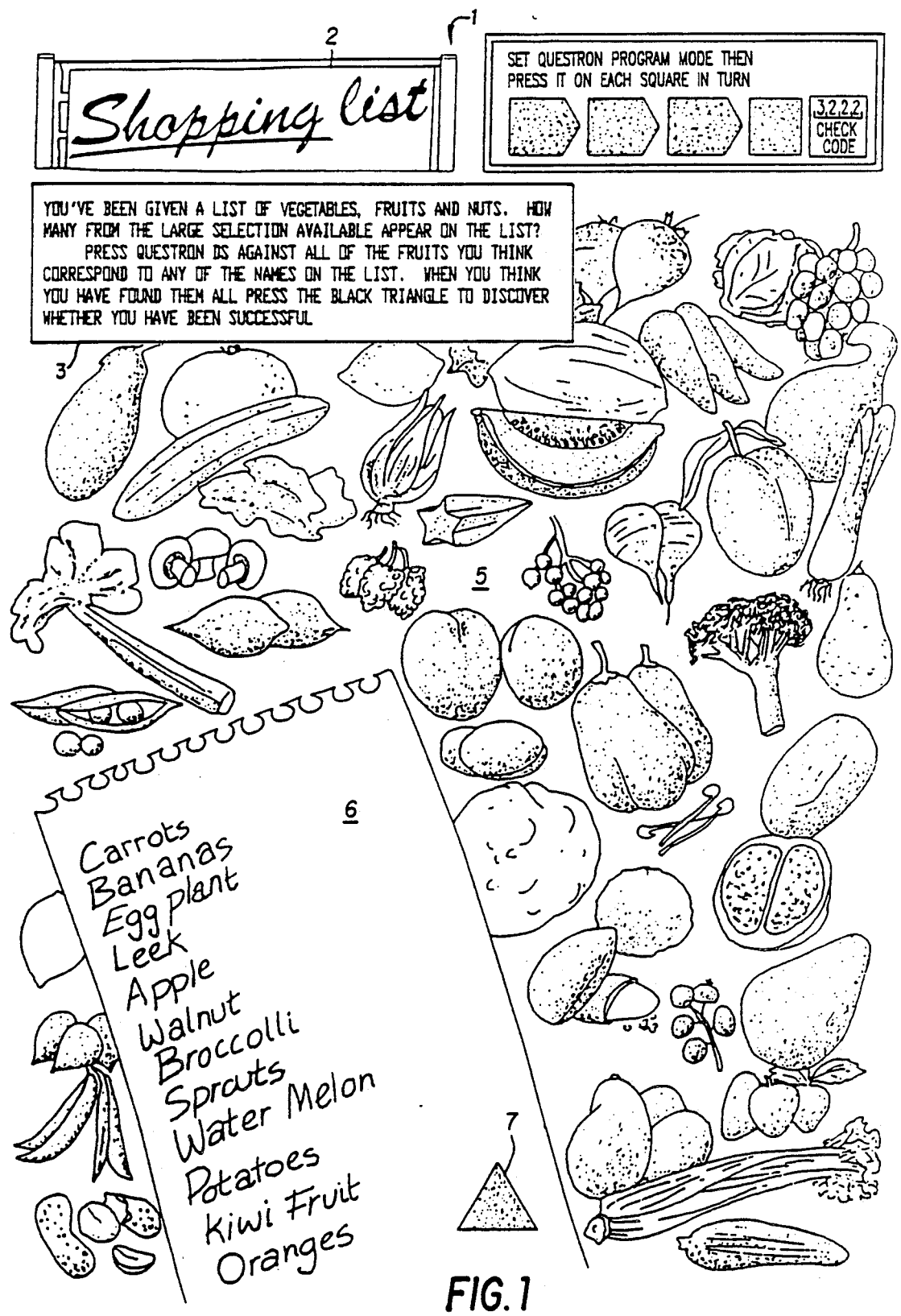

United States Patent [19]

Frazer et al.

[11] Patent Number: 4,990,093
[45] Date of Patent: Feb. 5, 1991

[54] TEACHING AND AMUSEMENT APPARATUS

[76] Inventors: Stephen O. Frazer, 124 Fordwych Road, London, United Kingdom, NW2 3PB; Martin P. Riddiford, 23 Elfindale Road, London, United Kingdom, SE24

[21] Appl. No.: 382,626

[86] PCT. No.: GB88/00068
§ 371 Date: Aug. 7, 1989
§ 102(e) Date: Aug. 7, 1989

[87] Int. Pub. No.: WO88/05951
Int. Pub. Date: Aug. 11, 1988

[22] PCT Filed: Feb. 5, 1988

[30] Foreign Application Priority Data

Feb. 6, 1987 [GB] United Kingdom ............... 8702728

[51] Int. Cl.$^5$ .................................................. G09B 7/00
[52] U.S. Cl. ...................................... 434/337; 434/327; 434/335; 434/201; 382/65
[58] Field of Search ................ 434/313, 322, 327, 335, 434/337, 201; 382/65, 69; 235/462, 472

[56] References Cited

U.S. PATENT DOCUMENTS

| | | | |
|---|---|---|---|
| 3,834,042 | 9/1974 | Henry | 434/201 |
| 3,918,028 | 11/1975 | Humphrey et al. | 382/65 X |
| 3,974,575 | 8/1976 | Duncan | 434/201 |
| 4,377,741 | 3/1983 | Brekka et al. | 235/472 |
| 4,471,218 | 9/1984 | Culp | 235/462 X |
| 4,505,682 | 3/1985 | Thompson | 434/335 |
| 4,578,572 | 3/1986 | Hice | 235/472 |
| 4,678,894 | 7/1987 | Shafer | 364/413.01 |
| 4,729,564 | 3/1988 | Kuna et al. | 434/335 X |
| 4,817,185 | 3/1989 | Yamaguchi et al. | 382/65 X |
| 4,825,058 | 4/1989 | Poland | 235/472 |

FOREIGN PATENT DOCUMENTS

8302842 8/1983 PCT Int'l Appl. ............... 434/313

*Primary Examiner*—Robert Bahr
*Assistant Examiner*—Jennifer L. Doyle
*Attorney, Agent, or Firm*—Darby & Darby

[57] ABSTRACT

Teaching and amusement apparatus includes a self-contained electronic pen which is used in conjunction with specially printed material to provide an interactive system, e.g. in the form of a worksheet or book having question and answer areas. The pen senses differences, not visually discernable, in the infra-red radiation reflectivities of the answer areas to indicate audibly and visually whether a correct or incorrect answer has been selected. The pen operates in a programming mode wherein a program for the particular game to be played is loaded into the apparatus by sensing the reflectivities of areas on the worksheet or book and then is switched automatically into an active mode wherein correct and incorrect answers are sensed. The pen confirms to the user that the program has been correctly loaded into the apparatus.

9 Claims, 5 Drawing Sheets

OPPOSITES

FIND THE WORD WHICH IS OPPOSITE IN MEANING TO THE WORD IN CAPITAL LETTERS

YOUR HAVE 2 MINUTES TO ANSWER THE 15 QUESTIONS ONCE

FOR EXAM MODE PRESS THIS CODE FIRST

GAME MODE

 PRESS FOR % SCORE

1. CONTINUOUS: (A) SMALL (B) UNUSUAL (C) MONOTONOUS (D) EXCLUSIVE (E) PERIODIC

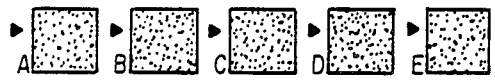

2. ZANY: (A) SOFT (B) ORNAMENTAL (C) UNPOPULAR (D) SERIOUS (E) DESOLATE

3. ENDANGER: (A) ASSESS (B) CLEANSE (C) PROTEST (D) REVEAL (E) PIERCE

4. DEMOTE: (A) ADVANCE (B) INTENSITY (C) VOCATE (D) PURITY (E) AGGRAVATE

5. AFFIRM: (A) HASTEN (B) DISTRIBUTE (C) SIMPLIFY (D) PROTECT (E) QUESTION

6. CORRECT: (A) INESSENTIAL (B) PERMANENT (C) IMPROPER (D) ATTRACTIVE (E) UNORTHODOX

7. VENTURESOME: (A) TIMID (B) ABRUPT (C) UNADAPTABLE (D) MUTINOUS (E) LEISURELY

8. OPAQUE: (A) IMPERTINENT (B) TRANSPARENT (C) INVISIBLE (D) DESCRIPTIVE (E) TESTED

9. ENDORSE: (A) CONDEMN (B) SPEAK QUIETLY (C) REFER (D) RECONSIDER (E) SEEM INTELLIGENT

10. NEGLIGIBLE: (A) UNGAINLY (B) UNCOMMITTED (C) UNACCOMPANIED (D) SUBSTANTIAL (E) FOREGONE

11. GRAVE: (A) TARDY (B) GRATEFUL (C) REMORSEFUL (D) INNOCURATE (E) FLIPPANT

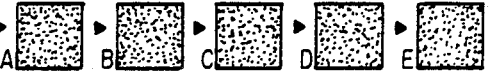

12. EVERYDAY: (A) INFREQUENT (B) UNUSUAL (C) PRECEDING (D) OUTRAGEOUS (E) INNATE

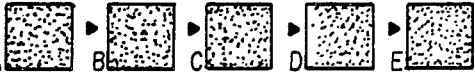

13. SOPORIFIC: (A) EXCITING (B) LIKELY TO HAPPEN (C) GREEDY (D) BLAMEWORTHY (E) EASY TO ANNOY

14. COALESCENCE: (A) STRIFE (B) SLOW RECOVERY (C) DIVISION (D) NOBLE BEHAVIOUR (E) IRREVERANCE

15. SQUANDER: (A) USE SPARINGLY (B) PREOCCUPY (C) BEFRIEND QUICKLY (D) ACCLIMATE (E) TRAVEL DIRECTLY

*FIG. 2*

TEACHING AND AMUSEMENT APPARATUS

This invention relates to teaching and amusement apparatus.

Published European Specification 0099920 discloses teaching and amusement apparatus of considerable value. A self-contained electronic "pin" is used in conjunction with specially printed material to provide interactive teaching devices in the form of a book or worksheet having question and answer areas. The pen is used by the user in a self-teaching or amusement fashion. Reference should be made to that specification for further detail. Products embodying the invention described in that specification have been successfully commercialised under the Registered Trade Mark Questron and have secured substantial user acceptance.

However, such products are of limited application, and the range of activities which may be carried out using them is limited. The printing of the printed material may also require very close control to ensure it works properly, which, though achievable, is expensive and so increases the cost of the product. The problem is to extend the application of such devices without putting even greater constraints on the printing of the printed material.

The problem is solved in accordance with the invention, by providing a hand-held detector including a sensor head for discriminating between areas of printed intelligence carried on a substrate, the detector giving a sense perceptible indication dependent on a property of the area of printed intelligence against which it is placed, characterised in that the detector can be switched between an active mode in which it can be used to differentiate between areas of printed intelligence and a programming mode in which a set of operating instructions can be input to control the operation in the active mode, and in that the detector includes a screen for displaying a visual output of the sense perceptible indication.

Such detectors have the major advantage that inexpensive manufacture of the printed material using standard printing techniques can be retained, and indeed the difficulties of providing material are eased, as if desired the discrimination effected by the detector can be on the basis of a visually distinguishable property, but the programmed instructions can compensate for that detectability to keep the amusement or learning activity interesting and challenging.

In the programming or learning mode, the detector is given a set of instructions which it uses to decide how to operate in an active mode. In the active mode the detector is used in conjunction with printed material to provide a wide variety of detailed responses, the detailed behaviour of the detector when used in conjunction with such printed material being conditioned by the data captured in its learning mode.

The most convenient way of putting the present invention to practice is of course by means of appropriate microelectronics, conveniently configured on a single chip, forming part of the detector. A simple switch or similar control may be used to switch the detector between learning and active modes, but the preferred mode of operation is to provide that on first being switched on the detector self-configures into a programming mode, and that it only changes to an active mode on receiving appropriate programming.

The preferred way of programming the detector is to provide, e.g. on the same sheet of printed material as the detector is to be used with in the active mode, a suitable code or the like which is "read" while the detector is in the learning mode and which is then used automatically by the detector to condition subsequent operations of the detector on that same sheet. This enables the coding for use in a learning mode and the material for use in an active mode to be printed on the same sheet and thus kept conveniently physically together and thus to minimise the occurrence in use of the detector learning to operate in one particular way which does not then correspond with the teaching or amusement data with which it is then used, i.e. it ensures that the detector and the paper are playing with the same rules.

Printed coding is most conveniently produced as a sequence of printed areas which are successively scanned by the detector unit. Depending upon the discrimination of the detector i.e. how many different sorts of printed area it can discriminate one from another, the code may be expressed in relatively few areas or more. If the detector is only able to discriminate between e.g. two levels of infra red reflectance (the technique described in the specification referred to above) then the coding must be expressed in a binary form. If the detector can distinguish three levels, a ternary code may be used and so on. Three levels represent an appropriate compromise enabling for example 81 different codes (three to the power 4) to be expressed by a sequence of 4 areas.

The detector specifically described and illustrated in the specification referred to above is in the form of a "pen" which produces output signals purely in the form of an audible signal, the precise audible signal varying dependent upon the infra-red reflectance sensed by the pen tip. In the present invention the pen has a visual output and may in addition have an audible output. In a particularly preferred form, the detector, when configured as a pen, consists of an elongate body having set in one end, conveniently referred to as the pen tip, a suitable sensor and having set in its other end a display device in the form of a suitably small screen. The screen of choice is that of a liquid crystal display, such as are used for example in digital watches. Such displays are relatively robust, require very little power to run, and are capable of producing a wide variety of effects by appropriate design and configuration. Thus areas of the display may be pre-patterned to enable the display of one or several numbers or digits using the conventional seven bar configuration, while other areas of the display may be configured as suitable pictorial displays, for example a tick to indicate a correct answer, a cross to indicate a wrong answer and a set of stars to indicate "lives". Further areas may be patterned to provide headings such as "SCORE", "TIME", "PROG", "TOTAL", "MIN", "SEC".

The detector may also be configured otherwise than as a pen. For example the detector may take the form of a generally flat block or tile having set in one face a pictorial display screen and having set in an opposite face a sensor head. In use, such a detector is laid on top of the printed material with which it is used so that the sensor head may interact with printed matter on the page, the results of that interaction being visible on the screen for the user. Adjacent the screen, a suitable switch may be advantageously incorporated with which a detection or sensing operation is carried out. The interior of the tile may contain the necessary microelectronics and an appropriate power supply to operate those microelectronics, e.g. one or more electrical cells.

The precise way in which the detector operates will depend upon the internal programming of the micro circuitry in the detector. The amount of program material and its nature may vary very widely, but will usually be contained in appropriate non-volatile memory. Desirably, in order to keep the size and power requirements of the unit to a minimum, the electronics are configured on a suitable single chip. The programming or learning mode can be thought of as selecting one from a number of different pre-programmed modes of operation which will be used for the next activity to be carried out by the user of the device. The detailed programming for various different sorts of activity does not form part of the present invention, and may be effected in known fashion. By suitable programming, very wide range of amusement or teaching activities may be carried out using a relatively small number of basic programs.

In contrast to the teaching and amusement apparatus described in European specification 0099920, where much reliance was placed for successful operation of the inability of the human eye to detect differences in printed matter which were essentially available for detection to the detector pen there described, the detector of the present invention does not need to be used in conjunction with printed material configured in this way, though it may be so used. The ability to make use of a complex set of rules (the precise selection of which is controlled in the learning mode) means that sophisticated activities may be carried out with the user of the detector not being able to predict e.g. which of a number of differently printed areas corresponds to a "right" answer.

Indeed, in one area that of programming, it is advantageous not to attempt to disguise the program coding, rather than to print it in visually discriminating form. In a particularly preferred embodiment of the invention, a programming or learning code is both printed on suitable material and identified on that material, e.g. by a sequence of four digits and the microelectronics and display means in the detector is arranged to display that sequence of four digits at the end of the programming mode, thus enabling the user to check visually that correct programming has been accomplished.

The detail and sophistication of the programming may be very considerable. Thus, for example, a first coded sequence may prompt the detector to ask for a further coded sequence of information to be detected before it switches from the programming mode to the active mode.

Figure 3:
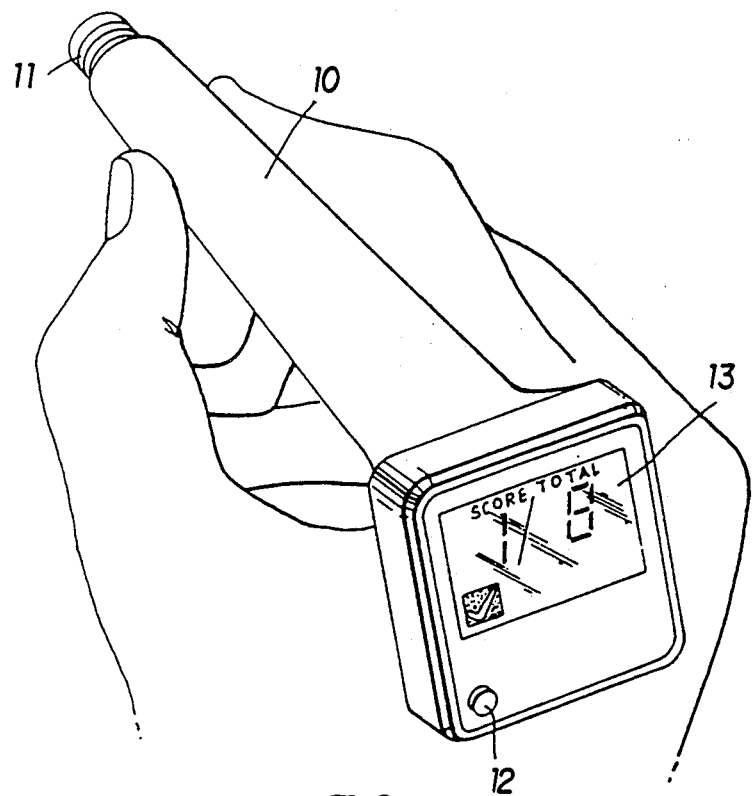
Figure 4:
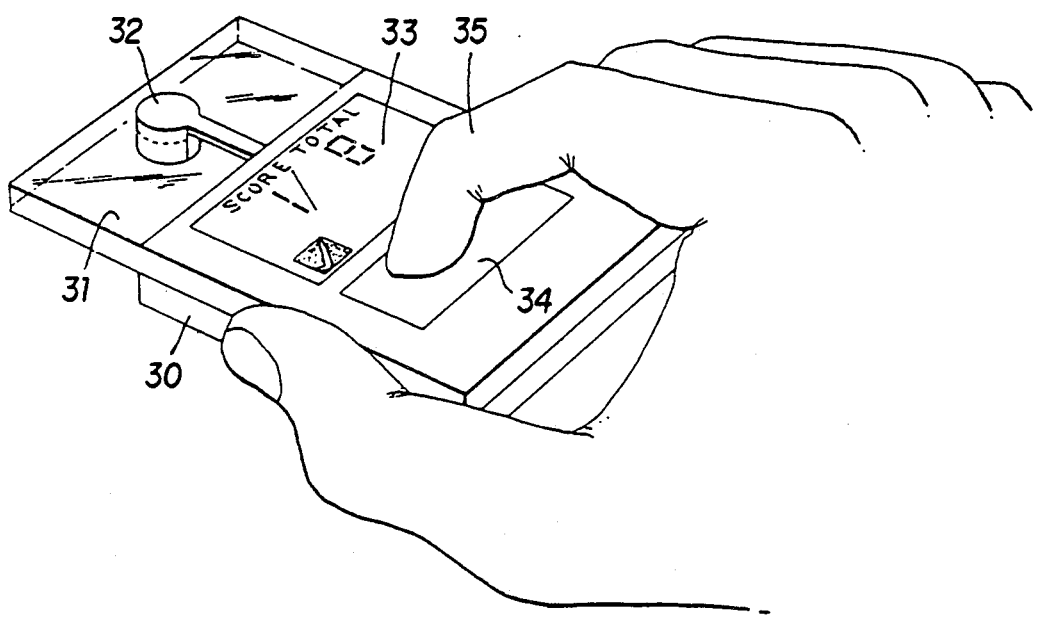
Figure 5:
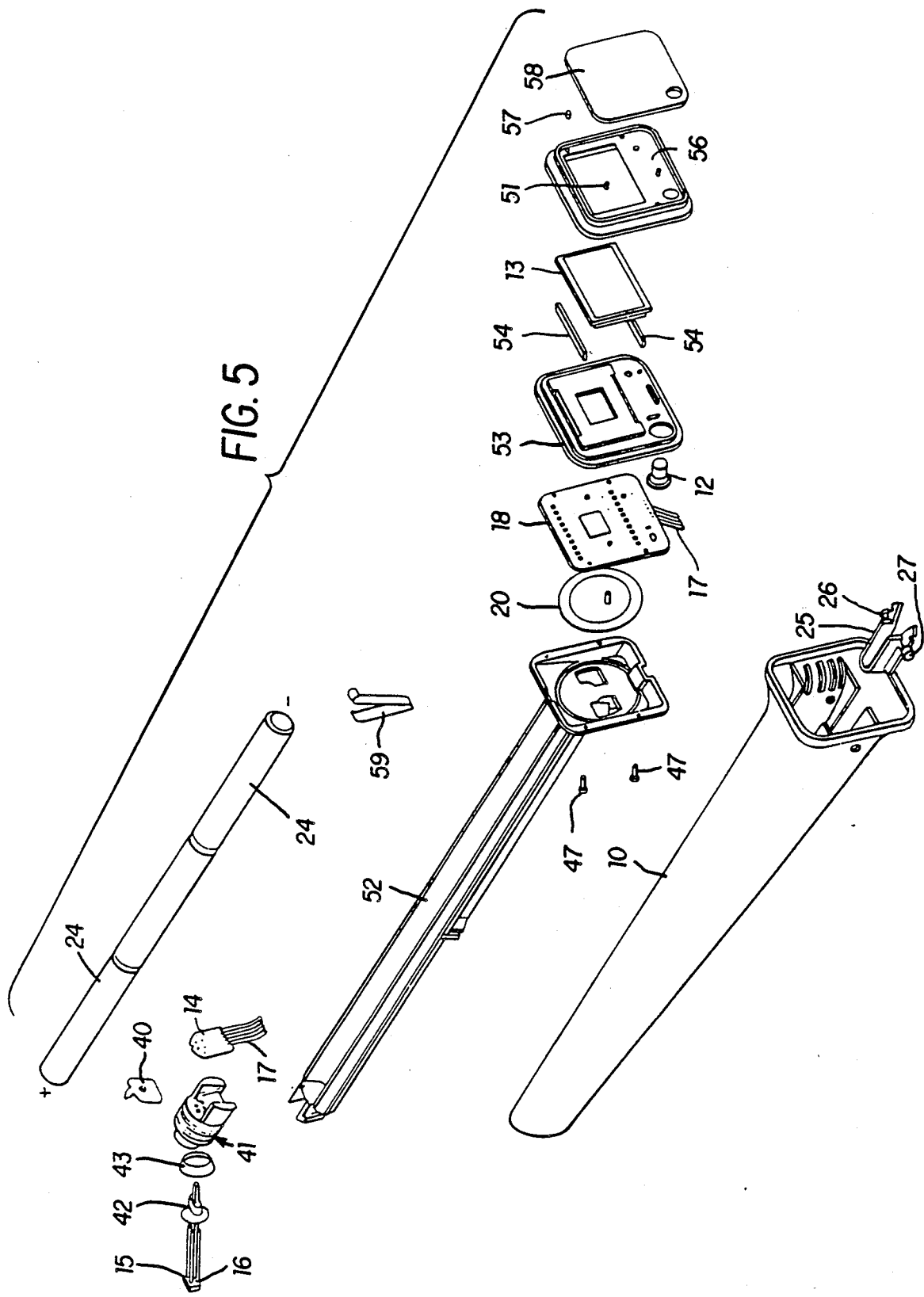
Figure 6:
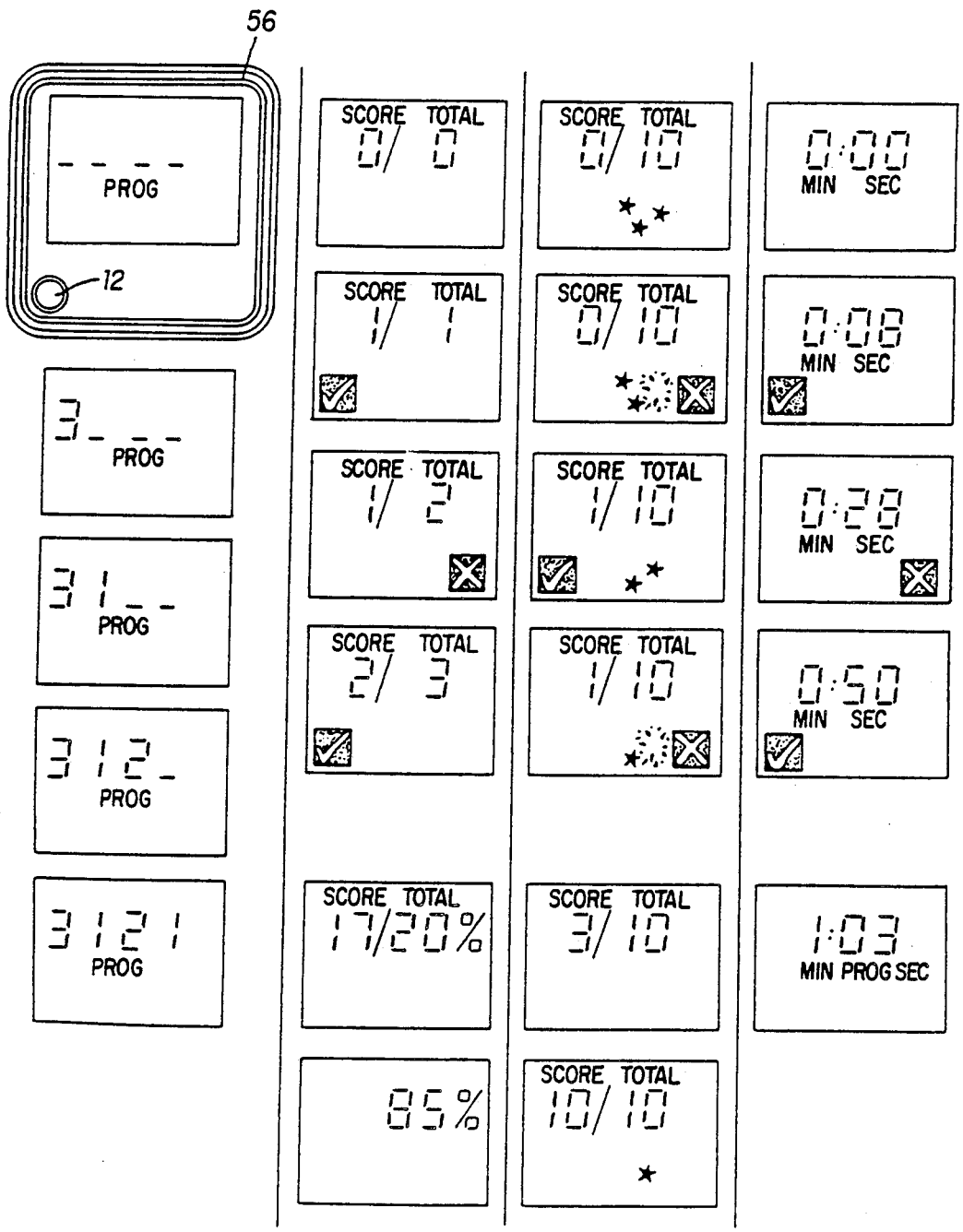

The invention is illustrated by way of example with reference to the accompanying drawings in which:

FIG. 1 is a diagrammatic representation of a first work sheet or page of a book adapted for use with a detector according to the invention, FIG. 2 is a representation of an alternative worksheet corresponding to a word game, FIG. 3 is a perspective sketch of a hand holding a first form of detector according to the invention, FIG. 4 is a perspective view of a hand holding a second form of detector according to the invention FIG. 5 is an exploded view of the detector of FIG. 3 showing its various components, FIG. 6 shows a variety of screen displays which may be achieved on the screen of the detector shown in FIG. 3.

Referring first to FIG. 1, this shows a printed page 1 bearing a number of different printed areas. For the particular amusing game presented, these consist of a title area 2, a rules area 3, a programming area 4, a pictorial area 5 and an inset area with printing on it 6.

The pictorial area 5 shows a large number of different fruits, vegetables and nuts. The inset printed area 6 is a shopping list listing certain fruits, vegetables and nuts.

The instruction area stating how the game is to be played reads as follows:

"You have been given a list of vegetables, fruits and nuts. How many, from the large selection available, appear on the list? Press the end of the wand against all of the fruits you think correspond to any of the names of the list. When you think you have found them all, press the end of the wand on the black triangle to discover whether you have been successful".

The black triangle is printed at the bottom of the page and is identified by reference numeral 7 in FIG. 1.

Near the top of the page is an identified printed area 4, containing an instruction line, four printed areas of colour, and a diagram. The instruction wording instructs the user to program the detector by pressing it on each of the four colour areas, and those areas are themselves shaped to indicate the correct order in which the wand is to be pressed on them, as shown in FIG. 1 reading from left to right.

The way of playing the game shown in FIG. 1 will be explained in more detail below.

FIG. 2 shows a somewhat more sophisticated word game. As in FIG. 1, there is a title area 2, a rules area 3 and a programming area 4. There is also a further programming area 4'. The reason for this is that there are two ways of playing the word game represented on FIG. 2. In one mode of playing the game, the user could pick, using the detector, which of the five possible answers he selects as right and could then receive an immediate indication of whether that was so or not, allowing the user to select another area if the first proved to be a "wrong answer". Such an approach would be to use the word data to teach pairs of "opposites" to the learner.

An alternative way of using precisely the same sheet would be in an "examination mode" where the user would select the answer he thought right with the detector, simply making one selection for each question, and then, at the conclusion of having answered the fifteen questions, he would place the detector head over the star shape identified by 7' whereupon the display in the detector would show the percentage score achieved, rather than showing which particular questions had been answered correctly and which incorrectly.

Turning now to FIG. 3, this shows a typical wand for use in the present invention. As can be seen, the wand is shaped like an elongate pen having an external casing 10 and an internal unit which has a sensor tip 11 at one end and, set in its other end face, an actuation button 12 and an LCD screen display 13. The end view of the pen shown in FIG. 3 shows only some of the various patterned areas in the LCD display, but it will be appreciated that the display may include a large number of such areas, not all of which will be actuated in any given set of circumstances. As can be seen from the end view in FIG. 3, the screen there illustrated shows two numerical digits separated by a "/". Titles consisting of the words SCORE and TOTAL, are selectively activated, as well as a symbol indicating "right" in this case a tick.

FIG. 4 shows an alternative form of detector. This takes the form of a flat rectangular package consisting of a main portion 30 which is grasped by the hand of the user and a transparent projecting portion 31 which houses a detector head 32 which has a downward face adapted to sense a property such as infra-red reflectance on a surface onto which the detector unit is placed. The upper face of the unit when so placed has an LCD display 33, the display on which is as shown in the detector of FIG. 3, and a pressure pad 34. Pressure pad 34 is an electrical contact switch which may be operated by the index finger 35 of the user. As explained below, with reference to FIG. 5, a contact ring in sensor 11' enables the microelectronics inside the detector to operate when the detector of FIG. 3 is pressed against paper. The detector of FIG. 4 is operated in a different fashion: it is moved such that detector head 33 lies over the desired printed area on the page, and switch 34 is then pressed. The microelectronics inside the detector of FIG. 4 may be arranged to turn the detector on after a period of non-use when pressure pad 34 is first pressed, and to turn it on in the programming mode. Programming can then be effected and the game or teaching procedure followed. The microelectronics may be arranged to turn the display off if no pressure is applied to pad 34 for, e.g. greater than 120 seconds.

FIG. 5 is an exploded view of the wand of FIG. 3 showing its construction. As noted above it consists of an outer plastics moulded casing 10 into which is slidably fitted an inner moulding 52 which acts as a carrier for the various other components. Moulding 52 has two laterally projecting ribs which engage between pairs of ribs moulded on the interior of the sides of casing 10. These ribs allow the unit 52 to be slid in and out of casing 10, though normally, for reasons explained below, the extent of such sliding movement is restricted.

Mounted at the left hand of unit 52 as shown in FIG. 5 are a number of components which constitute the sensor tip 11. Central to the operation is a combined infra red emitter 15, photo detector 16 unit which is set in a standard mounting 42. This sits in a moulded plastics component 41 which also receives a contact ring 43. Contact ring 43 enables it to be sensed when the pen is pressed down against a surface.

Located in the rear of moulded member 41 is a small printed circuit board 14 connected via a ribbon connector 17 which passes underneath the main body of member 52 when the components are all assembled together to lead to a main printed circuit board 18.

Main printed circuit board 18 is mounted by means of four screws 47 on the end of moulded unit 52. Between unit 52 and printed circuit board 18 is mounted a piezo electric transducer 20 having a contact spring 21 on one face. Contact spring 21 contacts an appropriate conductive member of printed circuit board 18 when the components are assembled together.

Also attached by screws 47 is a moulded member 53 which acts to hold in place, relative to printed circuit board 18, two electrical contacting strips 54 known as zebra strips. These connect portions of printed circuit board 18 to contacts on the edges of the liquid crystal display 13.

That crystal display is surrounded by a bezel 56 which has an aperture in it which serves to locate press button 12 in appropriate position over printed circuit board 18. Four threaded inserts 57 serve to maintain the printed circuit board 18 the bezel 56, and all the components shown between them in FIG. 5, in fixed relationship one to another. The liquid crystal display is protected by a moulded inset window 58 which is a snap fit in the bezel 56.

The upper portion of moulded member 52 is in the form of a long channel which serves for the receipt of three electrical cells 24. These fit into the top of moulded member 52 and electrical contacts 40 and 59 are provided at the respective ends thereof.

As noted, member 52 has lateral ribs which can be used to locate the member and its associated components and slide them into the housing 10. A clip 25 is provided to render the unit of member 52 and its associated components captive within casing 10. Clip 25 is generally U-shaped and has two laterally projecting prongs 26,27 which may locate in corresponding apertures in the sides of casing 10.

The underside of moulded member 52 is so configured that with clip 25 in place, i.e. with lugs 26 and 27 engaged in the apertures in the side of casing 10, the travel of the unit is restricted. At one end, its travel is restricted by the abutment of members 53 and 56 on the end of casing 10. At this stage, the unit is in its fully inserted position and as shown in FIG. 3. In order to change the batteries, when they have run down, the bezel 56 may be grasped and the whole unit withdrawn a certain extent. The extent of withdrawal is sufficient to enable one cell 24 to be removed sideways, whereafter the other cells 24 may slide along member 52 and be likewise removed. The fresh cells may be then inserted and the whole internals then pushed back into the outer casing 10. They may be held in the position shown in FIG. 3 by appropriate snap fitting means e.g. co-acting members on the wider end of casing 10 and on the bezel 56.

Printed circuit board 18 carries appropriate micro circuitry enabling the unit to operate in a learning or programming mode and in a game playing mode. A programming mode may be initiated by pressing press button 12. This causes a screen display to appear as shown at the top left in FIG. 6. FIG. 6 shows four columns of screen displays each corresponding to a series of screen displays which appear in use of the wand. The left hand column shows the appearance during a programming sequence, the other three columns show appearances during various games playing sessions.

When the Prog/Reset button 12 is pressed, the initial display is of four blank spaces. If the sensor tip of the pen is now pressed successively on the four areas in area 4 in FIG. 1, the infra red reflectance detector and associated circuitry will enable a signal to be fed to the circuitry corresponding to a four digit code. The code is a ternary code as illustrated, the infra red reflectance of the surface of each of the four areas in area FIG. 6 being categorised as 1, 2 or 3. Thus as the tour areas are successively contacted by the sensor end of the wand, four digits will appear in the LCD, as shown at the bottom of the left hand column in FIG. 6. The four digits may then be compared with a check code printed in box 4 on the page shown in FIG. 1. If the check code and the code then displayed on the screen match, then the wand is ready for use with the game printed on that page. If not, it is straightforward to press button 12 again and restart.

The check code, four positions, each with three variables, may be any one of 81 codes. The micro circuitry within may then cause the display to operate in conjunction with the signals from the sensor end of the pen to enable the user to play the game in question. In FIG. 1, the user presses the pen tip successively on the various items which he or she thinks correspond to the names on the shopping list, and when they think they have worked all the way through, they press the end on black triangle 7.

Using the printing techniques described in European published Application No. 0099920, the various fruits, vegetables and nuts are differently infra red reflective, the infra red reflectivity of the printed images thereof differing as the items in question are or are not on the shopping list illustrated at area 6.

When the user is satisfied that he or she has selected all of the items on the shopping list, area 7 may then be pressed and this provides a third level of infra red reflectance which may then cause the display to give an appropriate indication.

As the player carries out the activity, the wand may provide, by means of the piezo electric transducer 20, an indication of whether the identified item is or is not on the shopping list. The audible indication may be cheerful if it is, and a low buzz indicating "Wrong" if it is not. At the same time, the tick or cross areas may be activated on the LCD. These are visible at the lower left and right hand corners of the display respectively and are shown in some of the indications shown in FIG. 6.

When the pen is finally pressed on triangular area 7, a different sort of display may be provided e.g. a percentage of correct items identified, or the number of items correctly identified. Such a display may be accompanied by an appropriate audible indication, for example a cheerful one if the answers were mostly right, and a dull one if the answers were mostly wrong.

The sort of amusement game illustrated by FIG. 1 is one example of a very wide range of amusement games which can be operated in similar fashion. FIG. 2 shows a word game, where each question provides a word and five possible "opposites", one right and the rest wrong. The rules for selection, word or other games may vary very widely and the object of the game may be selected from a very wide range of possibilities. Multiple choice question and answer games such as that illustrated in FIG. 2 may be operated in more than one way. A further embodiment is that the programming of the electronics may mean that to "win" you have to carry out your answers within a certain period of time. The programming may display time as it passes on the LCD, or, for example, display a decreasing amount of time left before the number of correct answers found is displayed. A sequence of displays which might arise during such a game is shown in the right hand column of FIG. 6.

Tracking games, maze games, and find-the-spot type games can all be played. A particularly attractive and entertaining form of game provides the player with a number of lives, represented by stars on the display, which are lost if the pen does not find the right areas on the printed sheet. The detail and complexity of games which can be played with the apparatus of the present invention may be vary very widely indeed, the limits depending wholly upon the programming capacity of the micro electronics and the ingenuity of the programmer.

The circuitry may, of course, be arranged to operate in precisely the same way as the pen described in the European Patent Specification referred to above, by an appropriate selection of programming areas teaching the pen to operate in that way.

We claim:

1. An interactive apparatus for use in conjunction with a substrate bearing information in coded form, said apparatus comprising:
   a hand held body;
   an infra red sensing detector head at one end of said body;
   means for discriminating between intelligence carrying indicia printed on said substrate, said means for discriminating providing a sense perceptible signal in response to a property of said indicia when said detector is positioned against said indicia;
   means within said body for switching said apparatus between a first mode in which said apparatus differentiates between a plurality of said intelligence containing printed indicia and a second mode wherein a set of operating instructions can be selected and input from indicia on said substrate for controlling the operation of said first mode;
   said apparatus including within said body an audible output means, a screen located at the end of said body opposite said detector head for displaying in alphanumeric form a visual output of said sense perceptible signal, and means for producing a signal to inform a user that a pre-selected set of operating instructions has been input to said apparatus.

2. An interactive apparatus according to claim 1, wherein upon receiving a set of operating instructions in the second mode, the detector automatically switches to the first mode.

3. An interactive apparatus according to claim 1, wherein the sensing detector can discriminate between at least two sorts of printed intelligence.

4. An interactive apparatus according to claim 2, wherein the detector can discriminate between three sorts of printed intelligence.

5. An interactive apparatus according to claim 1, wherein the detector is shaped substantially to be held like a pen.

6. An interactive apparatus according to claim 1, comprising a generally flat body having said detector head extending therefrom and the screen set in one face thereof.

7. An interactive apparatus according to claim 6, wherein the flat body includes a transparent extension in which the detector head is set.

8. An interactive apparatus according to claim 1, wherein the screen is a liquid crystal display.

9. An interactive apparatus according to claim 1, wherein the display is divided into pre-patterned areas which each contain either an alphanumeric display and/or a pictorial display.

* * * * *